United States Patent
Nakamuta et al.

(10) Patent No.: US 8,845,822 B2
(45) Date of Patent: Sep. 30, 2014

(54) COMBUSTIBLE GAS

(75) Inventors: Masahiko Nakamuta, Osaka (JP); Toshiaki Hashimoto, Osaka (JP); Yoshifumi Yoshida, Moriyama (JP); Kazuto Matsumoto, Moriyama (JP)

(73) Assignee: IWATANI Corporation, Osaka (JP)

( * ) Notice: Subject to any disclaimer, the term of this patent is extended or adjusted under 35 U.S.C. 154(b) by 0 days.

(21) Appl. No.: 13/981,270

(22) PCT Filed: Mar. 11, 2011

(86) PCT No.: PCT/JP2011/055814
§ 371 (c)(1),
(2), (4) Date: Jul. 23, 2013

(87) PCT Pub. No.: WO2012/124030
PCT Pub. Date: Sep. 20, 2012

(65) Prior Publication Data
US 2013/0340893 A1    Dec. 26, 2013

(51) Int. Cl.
*B23K 35/22* (2006.01)
*F17C 1/00* (2006.01)
*B23K 35/38* (2006.01)
*C10L 3/02* (2006.01)

(52) U.S. Cl.
CPC ........... *B23K 35/228* (2013.01); *Y02E 60/321* (2013.01); *F17C 1/00* (2013.01); *B23K 35/38* (2013.01); *C10L 3/02* (2013.01)
USPC .......................................... 148/196; 148/194

(58) Field of Classification Search
CPC ..................................... C10L 3/00; C10L 3/02
USPC .................................................. 148/194, 196
See application file for complete search history.

(56) References Cited

U.S. PATENT DOCUMENTS 1,404,231 A *   1/1922  Rose et al. ............... 48/199 FM
2013/0340893 A1* 12/2013 Nakamuta et al. ............ 148/194

FOREIGN PATENT DOCUMENTS

| CN | 1298928 A | 6/2001 |
| CN | 1861765 A | 11/2006 |
| JP | 53-109504 | 9/1978 |
| JP | 53-118401 | 10/1978 |
| JP | 2003-129072 A | 5/2003 |

OTHER PUBLICATIONS

International Preliminary Report on Patentability; PCT/JP2011/0055814; Jun. 16, 2011.
International Search Report; PCT/JP2011/055814; Apr. 12, 2011.

* cited by examiner

*Primary Examiner* — Scott Kastler
(74) *Attorney, Agent, or Firm* — Studebaker & Brackett PC

(57) ABSTRACT

Combustible gas, which is easy to be stored, transported and the like and can contribute to improving the quality of a finished state of an operation such as gas cutting, gas welding or brazing, contains ethylene at 38 v/v % or more and 45 v/v % or less and the remainder being hydrogen and unavoidable impurity.

5 Claims, 2 Drawing Sheets

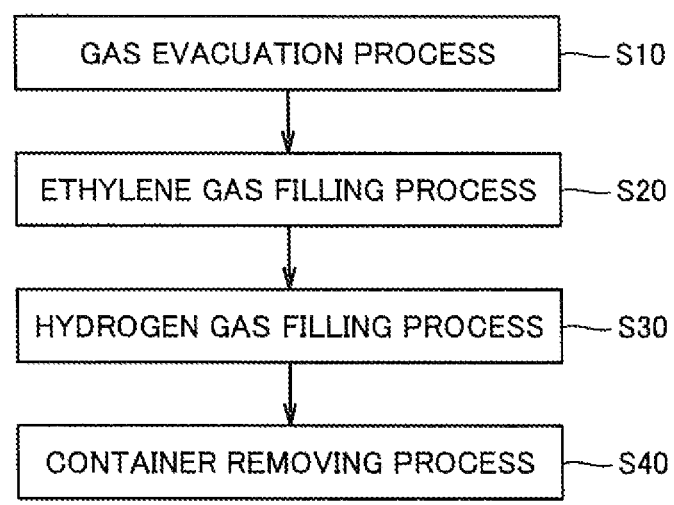

COMBUSTIBLE GAS

TECHNICAL FIELD

The present invention relates to a combustible gas, and particularly to a combustible gas suitable for gas cutting, gas welding, brazing or the like.

BACKGROUND ART

Acetylene ($C_2H_2$) is widely used as a combustion gas in gas cutting, gas welding, brazing or the like. Acetylene is superior in combustion speed and combustion intensity, and thereby preferable as the combustion gas.

However, when acetylene undergoes storage, transportation or the like in a state of compressed gas, an explosive decomposition is likely to occur. Therefore, acetylene is stored or transported in a state of being dissolved in a solvent such as acetone or dimethylformamide, which in turn makes acetylene unsuitable for mass transportation in collective containers or large scale containers.

In this regard, there is suggested a proposal to use a mixture gas of ethylene at 20 to 80 v/v % and hydrogen at 80 to 20 v/v % as a substitute gas for acetylene. Thereby, it is considered possible to obtain such advantageous effects as improved safety in a ship-bottom maintenance operation or a pit maintenance operation due to rapid diffusion of the mixture gas into atmosphere, combustion performance similar to acetylene, low price, and easy storage and transportation thereof (for example, see Japanese Patent Laying-Open No. 53-118401 (PTD 1)).

CITATION LIST

Patent Document

PTD 1: Japanese Patent Laying-Open No. 53-118401

SUMMARY OF INVENTION

Technical Problem

Meanwhile, in the field of gas cutting, gas welding, brazing or the like, the finished state of an operation is required to be of a high quality, and in recent years, the required quality has been becoming higher and higher. Specifically, in gas cutting, for example, it is required not only to reduce the occurrence of edge dropping on a cutting surface (deformation of an outer circumference of the cutting surface), adhesion of slag to the outer circumference of the cutting surface and the like, but also to reduce surface roughness of the cutting surface. In order to cope with such requirements, adjusting a cutting speed, adjusting the tip-to-work distance and the like are known as efficient approaches.

The present invention has been accomplished in view of the aforementioned problems, and it is therefore an object of the present invention to provide a combustible gas which is easy to be stored, transported and the like and can contribute to improving the quality of a finished state of an operation such as gas cutting, gas welding or brazing.

Solution to Problem

A combustible gas according to the present invention is a combustible gas used as a combustion gas in gas cutting of a steel and contains ethylene at 38 v/v % or more and 45 v/v % or less, and the remainder being hydrogen and unavoidable impurity.

The inventors of the present invention had performed detailed examinations on improving the quality of a finished state of an operation such as gas cutting, gas welding or brazing. Consequently, they discovered that a mixture gas of ethylene and hydrogen not only is beneficial in storage, transportation and the like in comparison to acetylene but also contributes to improving the finished state by adjusting appropriately a mixing ratio between ethylene and hydrogen, which thereby leads to the present invention.

Specifically, in the case of gas cutting, for example, setting the content of ethylene to 38 v/v % or more and 45 v/v % or less can not only improve draining of generated slag but also reduce the surface roughness of the cutting surface. Moreover, the combustible gas of the present invention can be stored or transported in a compressed gas state, which facilitates mass transportation of the combustible gas in collective containers or large scale containers. If the content of ethylene is too low, it is possible to have backfire occurred when the combustible gas is in combustion or when the combusting gas is being extinguished; however, the backfire can be prevented if the content of ethylene is set to at least 38 v/v %. Thus, according to the present invention, it is possible to provide a combustible gas which can not only be stored, transported and the like easily but also contribute to improving the quality of a finished state of an operation such as gas cutting, gas welding or brazing.

Preferably, in the combustible gas, the unavoidable impurity is 0.5 v/v % or less. Thereby, the combustible gas is stabilized in property, which enables the effects of the present invention to be attained for certain. In order to further stabilize the combustible gas in property, it is desired that the unavoidable impurity is 0.1 v/v % or less.

It is acceptable that the combustible gas is sealed in a container and the pressure in the container is 1 MPa or more and 14.7 MPa or less at 35° C.

The combustible gas of the present invention may be prepared by mixing ethylene gas with hydrogen gas at a working place where an operation such as gas cutting, gas welding or brazing is to be performed and used therein. On the other hand, the combustible gas of the present invention may be prepared by mixing ethylene gas with hydrogen gas, sealed in a container, thereafter transported to a working place where an operation such as gas cutting, gas welding or brazing is to be performed while being stored in the container, and used therein. In this case, in order to make the transportation efficient, it is preferable to raise the pressure in the container. However, if the pressure is raised too high, the ethylene liquefies at a low temperature, making it difficult to attain the desired mixing ratio between ethylene and hydrogen at the time of use. Limiting the pressure in the container to 1 MPa or more and 14.7 MPa or less at 35° C. makes it possible to achieve the efficient transportation while preventing the mentioned problem from occurring. In order to achieve more efficient transportation, the pressure in the container at 35° C. is preferably 5 MPa or more, and more preferably 10 MPa or more.

Advantageous Effects of Invention

It is obvious from the above description that according to the present invention, it is possible to provide a combustible gas which can not only be stored, transported and the like easily but also contribute to improving the quality of a finished state of an operation such as gas cutting, gas welding or brazing.

BRIEF DESCRIPTION OF DRAWINGS

FIG. 2 is a flow chart illustrating an example of a preparation method of the combustible gas.

DESCRIPTION OF EMBODIMENTS

Figure 1:
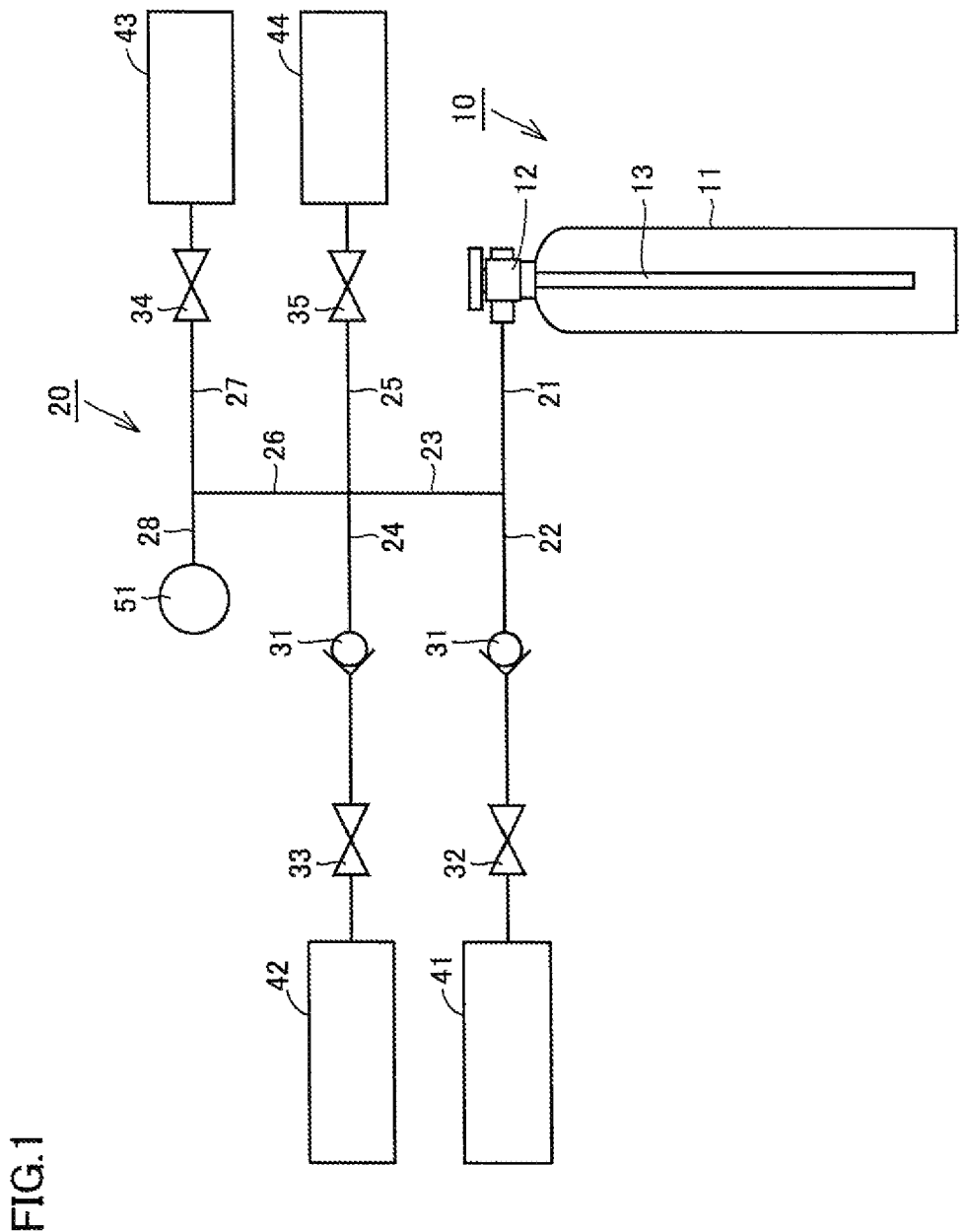
FIG. 1 is a schematic view illustrating an example of a preparation apparatus of a combustible gas.

Hereinafter, an embodiment of the present invention will be described with reference to the drawings. A combustible gas of the present invention can be prepared as described below, for example. Firstly, a preparation apparatus of the combustible gas will be described with reference to FIG. 1.

With reference to FIG. 1, the combustible gas in the present embodiment is produced by filling ethylene gas and hydrogen gas at a desired mixing ratio into a container 10. Container 10 is a pipe-equipped container including a main body 11 for containing the combustible gas, a container valve 12 disposed in main body 11 and a pipe 13 being connected to container valve 12 and extending into main body 11. Container 10 is connected, through the intermediary of a pipe system 20, to a hydrogen gas storage section 41, an ethylene gas storage section 42, a decompression device 44, a gas discharging section 43, and a pressure gauge 51.

Specifically, container 10 is connected to a pipe 21, and pipe 21 is connected to a pipe 22 which is connected to hydrogen gas storage section 41. Pipe 22 is disposed with a check valve 31 configured to prevent gas from flowing toward hydrogen gas storage section 41. Moreover, pipe 22 is disposed with a valve 32 between check valve 31 and hydrogen gas storage section 41.

Pipe 21 is further connected to a pipe 23, and pipe 23 is connected to a pipe 24 which is connected to ethylene gas storage section 42. Pipe 24 is disposed with check valve 31 configured to prevent gas from flowing toward ethylene gas storage section 42. Moreover, pipe 24 is disposed with a valve 33 between check valve 31 and ethylene gas storage section 42.

Pipe 23 is also connected to a pipe 25 which is connected to decompression device 44 such as a vacuum pump. Pipe 25 is disposed with a valve 35. Pipe 23 is further connected to a pipe 26, and pipe 26 is connected to a pipe 28 which is connected to pressure gauge 51. Thereby, the pressure in pipe system 20 can be supervised through pressure gauge 51 in communication with pipe system 20. Pipe 26 is further connected to a pipe 27 which is connected to gas discharging section 43 for discharging gas in pipe system 20 to the outside. Pipe 27 is disposed with a valve 34.

Hereinafter, a preparation method (filling method) of the combustible gas will be described with reference to FIG. 1 and FIG. 2. As illustrated by FIG. 2, in the filling method of the combustible gas according to the present embodiment, firstly, a gas evacuation process is performed at step S10. With reference to FIG. 1, at step S10, container 10 is connected to pipe 21 with valves 32, 33, 34 and 35 being kept in a closed state, and container valve 12 is opened thereafter. In this situation, if the remaining gas in main body 11 of container 10 has a predetermined pressure or more, valve 34 is opened to discharge the gas from gas discharging section 43. The pressure of the gas in main body 11 can be supervised through pressure gauge 51. Thereafter, valve 35 is opened with valve 34 being kept in a closed state, and decompression device 44 is operated to depressurize main body 11. After the pressure in main body 11 is reduced to a desired pressure which is confirmed through pressure gauge 51, valve 35 is closed and the operation of decompression device 44 is stopped.

Next, ethylene gas filling process is performed at step S20. At step S20, ethylene gas is filled into main body 11 of container 10 which is depressurized at step S10. Specifically, with reference to FIG. 1, valve 33 is opened to fill ethylene gas stored in ethylene gas storage section 42 into main body 11. At the timing when the pressure in main body 11 of container 10 reaches a necessary pressure for limiting the ratio of ethylene contained in the combustible gas to 38 v/v % or more and 45 v/v % or less, valve 33 is closed, and the filling of ethylene gas is terminated.

Then, a hydrogen gas filling process is performed at step S30. At step S30, hydrogen gas is filled into main body 11 of container 10 which is filled with ethylene gas at step S20. Specifically, with reference to FIG. 1, valve 32 is opened to fill hydrogen gas stored in hydrogen gas storage section 41 into main body 11. At the timing when the pressure in main body 11 of container 10 reaches the necessary pressure for limiting the ratio of ethylene contained in the combustible gas to 38 v/v % or more and 45 v/v % or less, valve 32 is closed, and the filling of hydrogen gas is terminated.

Thereafter, a container removing process is performed at step S40. At step S40, container valve 12 of container 10 which is filled with ethylene gas and hydrogen gas at step S20 and step S30, respectively is closed, and container 10 is removed from pipe system 20. According to the abovementioned processes, the combustible gas of the present invention, which contains ethylene at 38 v/v % or more and 45 v/v % or less with the remainder being hydrogen and unavoidable impurity, is prepared. The combustible gas can be stored, transported and the like easily and can contribute to improving the quality of a finished state of an operation such as gas cutting, gas welding or brazing.

Here, preferably, the unavoidable impurity mentioned above is at 0.5 v/v % or less, and more preferably at 0.1 v/v % or less. Thereby, the combustible gas is stabilized in property. In addition, it is preferable that the pressure in container 10 is 1 MPa or more and 14.7 MPa or less at 35° C. Thereby, it is possible to achieve efficient transportation while preventing ethylene from liquefying. In order to achieve more efficient transportation, the pressure in container 10 at 35° C. is preferably 5 MPa or more, and more preferably 10 MPa or more.

Ethylene gas and hydrogen gas filled in container 10 reach a homogeneous mixing state after a predetermined time elapses from the filling. In order to shorten the time required to achieve the homogeneous mixing state, it is acceptable, for example, to adjust the inner diameter of pipe 13. In addition, in the abovementioned embodiment, the description is made on the case where the combustible gas is filled into container 10; however, the combustible gas of the present invention is not limited to the case. For example, the combustible gas of the present invention may be prepared by mixing ethylene gas with hydrogen gas at a working place where an operation such as gas cutting, gas welding or brazing is to be performed and used therein without being filled into a container. Further, in the abovementioned embodiment, the description is made on the case where the mixing ratio between ethylene gas and hydrogen gas is controlled according to the pressure; however, it is acceptable that container 10 is placed on a weighting apparatus and the mixing ratio is controlled according to a weight thereof. Furthermore, in the abovementioned embodiment, the description is made on the case where container 10 is adopted as a container equipped with pipe 13 and the filling of gases is performed in the sequence of ethylene gas and hydrogen gas; however, the preparation method of the combustible gas of the present invention is not limited thereto. For example, it is acceptable that the combustible gas of the present invention is prepared by filling the gases in the sequence of hydrogen gas and ethylene gas into a container equipped with no pipes. In other words, as long as ethylene gas and hydrogen gas can be mixed homogenously, the gas filling sequence and/or the presence of pipes are optional.

Example

An experiment was performed on examining the state of a cut portion in gas cutting of a steel by using a mixture gas of ethylene and hydrogen. The experiment has the following sequence.

Firstly, a steel plate (having a thickness of 25 mm and a width of 300 mm), which is a rolled steel for general structure satisfying JIS (Japanese Industrial Standards) G3101 SS400, was prepared as the steel. The steel was cut via gas cutting under the following conditions: the cutting tip: middle pressure type, three-stage contacting No. 2, tip-to-work distance: 5 mm, and the cutting speed: 350 mm/min. The combustible gas having the ratio of ethylene gas at 30 to 50 v/v % in the mixture gas of ethylene gas and hydrogen gas was used as the combustion gas. The combustible gas being used here was prepared by mixing ethylene gas and hydrogen gas flowing at a respective flow rate predetermined to provide the desired composition of the mixture gas. For comparison, acetylene was used as the combustion gas to perform gas cutting. After the cutting, according to the visual check on the appearance of the cutting portion, the presence of edge dropping and slag adhesion thereon and the investigation on the roughness of the cutting surface, the finished state of the cutting portion was evaluated. The roughness of the cutting surface was measured according to JIS B 0601-2001. The experimental conditions and the experimental results are shown in Table 1.

and the roughness of the cutting surface, it can be concluded that the finished state after the cutting is good. Therefore, it is confirmed that the combustible gas of the present invention can contribute to improving the quality of the finished state of an operation.

It should be understood that the embodiments and examples disclosed herein have been presented for the purpose of illustration and description but not limited in all aspects. It is intended that the scope of the present invention is not limited to the description above but defined by the scope of the claims and encompasses all modifications equivalent in meaning and scope to the claims.

INDUSTRIAL APPLICABILITY

The combustible gas of the present invention is especially applicable to gas cutting, gas welding, brazing or the like.

REFERENCE SIGNS LIST

10: container; 11: main body; 12: container valve; 13: pipe; 20: pipe system; 21-28: pipe; 31: check valve; 32-35: valve; 41: hydrogen gas storage section; 42: ethylene gas storage section; 43: gas discharging section; 44: decompression device; 51: pressure gauge.

The invention claimed is:

1. A combustible gas used as a combustion gas in gas cutting of a steel, comprising:
38 v/v % to 44 v/v % ethylene, and
the remainder being hydrogen and unavoidable impurity.

2. The combustible gas according to claim 1, wherein said unavoidable impurity is 0.5 v/v % or less.

3. The combustible gas according to claim 1, wherein the combustible gas is sealed in a container, and a pressure in said container is 1 MPa or more and 14.7 MPa or less at 35° C.

TABLE 1

| | Composition (v/v %) | | Flow Rate (L/hr) | | Appearance Evaluation | Edge Dropping | Slag Adhesion | Roughness Ra (μm) | Roughness Rz (μm) | Roughness Rq (μm) |
|---|---|---|---|---|---|---|---|---|---|---|
| No. | Ethylene | Hydrogen | Ethylene | Hydrogen | | | | | | |
| 1 | 30 | 70 | 300 | 700 | D | — | — | — | — | — |
| 2 | 35 | 65 | 350 | 650 | C | Yes | Upper edge | 7.541 | 42.260 | 9.296 |
| 3 | 38 | 62 | 380 | 620 | B | None | Slightly on upper edge | 7.558 | 42.928 | 9.288 |
| 4 | 39 | 61 | 390 | 610 | B | None | Slightly on upper edge | 6.340 | 36.313 | 7.671 |
| 5 | 40 | 60 | 400 | 600 | A | None | None | 6.874 | 38.340 | 8.365 |
| 6 | 41 | 59 | 410 | 590 | A | None | None | 4.581 | 27.164 | 5.615 |
| 7 | 42 | 58 | 420 | 580 | A | None | None | 6.845 | 39.004 | 8.359 |
| 8 | 44 | 56 | 440 | 560 | A | None | None | 6.522 | 38.769 | 10.470 |
| 9 | 45 | 55 | 450 | 550 | B | None | Lower edge | 6.233 | 38.258 | 7.894 |
| 10 | 47 | 53 | 470 | 530 | C | None | Lower edge | 8.389 | 44.544 | 10.249 |
| 11 | 50 | 50 | 500 | 500 | C | None | Lower edge | 7.317 | 42.401 | 9.212 |
| 12 | Acetylene: 100 | | Acetylene: 480 | | B | None | None | 6.992 | 41.014 | 9.073 |

In "Appearance Evaluation" column of Table 1, A, B, C and D denote "perfect", "good", "bad" and "extremely bad", respectively. Additionally, since the appearance of the cutting portion was extremely bad under condition No. 1, the evaluation on the other items was not performed except the appearance evaluation.

As shown in Table 1, when the ratio of ethylene gas is in the range of 38 v/v % or more and 45 v/v % or less, the appearance evaluation is equivalent to or even better than the case where acetylene is used, and in addition, judging comprehensively the evaluations on the edge dropping, the slag adhesion 4. A gas cutting method of steel, comprising the steps of:
preparing a steel; and
cutting said steel by using a combustible gas as a combustion gas to cut said steel, wherein
said combustible gas includes 38 v/v % to 44 v/v % ethylene, and
the remainder is hydrogen and unavoidable impurity.

5. The gas cutting method of steel according to claim 4, wherein said steel is a rolled steel for general structure.

* * * * *